Dec. 11, 1945.   R. L. HAYNES   2,390,833
LIGHT MEASURING METHOD AND SYSTEM
Filed Dec. 30, 1942

ROBERT L. HAYNES,
INVENTOR.

BY
ATTORNEY.

Patented Dec. 11, 1945

2,390,833

UNITED STATES PATENT OFFICE 2,390,833

LIGHT MEASURING METHOD AND SYSTEM

Robert L. Haynes, Indianapolis, Ind., assignor to Radio Corporation of America, a corporation of Delaware Application December 30, 1942, Serial No. 470,683

8 Claims. (Cl. 315—129)

This invention relates to electrical measuring apparatus, and particularly to a method of and system for electrically measuring the light output of a light source such as a mercury vapor lamp.

It is well known that, due to temperature variations caused by changes in ventilation, thermal inertia effects, etc., the light output of a vapor lamp cannot ordinarily be correlated with a single electrical measurement in the lamp energizing circuit as is possible with incandescent lamps. A calibration of light output against current or voltage drop alone is of no value unless the lamp can always be operated under exactly the same conditions of ambient temperature, ventilation, and in perfect thermal equilibrium. In practical applications of vapor lamps it is impractical to maintain cooling conditions constant, and therefore both lamp voltage and current must be measured in order to obtain a true indication of the light output. Under these circumstances two electrical measurements must be taken, and these measurements referred to a graph or chart to determine the actual light output, this procedure being cumbersome and time-consuming.

The principal object of this invention, therefore, is to determine the light output of a vapor lamp from a single meter reading or measurement.

Another object of the invention is to provide an improved energizing and measuring system for vapor lamp light sources.

A further object of the invention is to provide a single reading meter circuit which will accurately indicate the light output of a vapor lamp.

A further object of the invention is to provide an energizing and bias type measuring circuit for a vapor lamp light source.

Although the novel features which are believed to be characteristic of this invention are pointed out with particularity in the claims appended herewith, the manner of its organization and the mode of its operation will be better understood by referring to the following description, read in conjunction with the accompanying drawing, in which:

In the past wattmeter measurements of the power input to vapor lamps have been considered as providing a satisfactory indication of the light output of such lamps. However, experience with vapor lamps indicates that although such a power reading is considerably better than a current or voltage measurement only, it is still only a very rough approximation of the light output since the light output varies much more rapidly with voltage changes, under a constant current condition, than it does with current changes under a constant voltage condition. It is believed that the graph in Figure 1, showing the performance of a small vapor lamp, will aid in understanding these factors.

Figure 1:
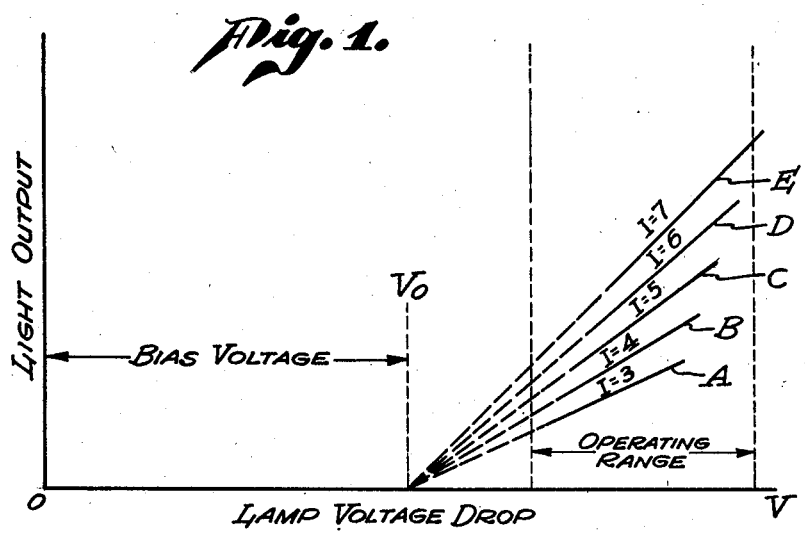
Figure 1 is a graph indicating the operation of the invention.

In Figure 1 the five curves, A to E inclusive, are drawn between the voltage drop across the lamp and the light output therefrom under different conditions of ventilation which varied the temperature at which the lamp operated, each solid line curve representing a constant current of the value indicated thereon through the lamp over a useful range of light outputs. By reading vertically at some definite voltage it will be seen that a 1 percent change in current results in about a 1 percent change in light. However, reading horizontally, it will be seen that a 1 percent change in voltage along a constant current curve produces about a 2½ percent change in light. Thus, the readings of a normally connected wattmeter, which responds equally to a given percentage change in current or voltage, cannot possibly be correlated accurately with the light output.

In Figure 1, if the family of curves indicated by the solid lines are extended to the left, as shown by the dotted lines, they will converge and cross the voltage axis at a point marked $V_0$. Now if the lamp voltage is measured in terms of excess voltage above $V_0$ instead of the total voltage drop $V$, then the light output is proportional to the excess or over-voltage $(V-V_0)$. As the light output is approximately proportional to current with a constant voltage, and both current and voltage are varied, then the light output is proportional to the product of the current (I) and the total voltage drop minus the bias voltage $(V-V_0)$. Thus, if a dynamometer type of wattmeter reading is taken to indicate this product, this single reading will provide a reliable indication of the light output of a vapor lamp light source.

Figure 2:
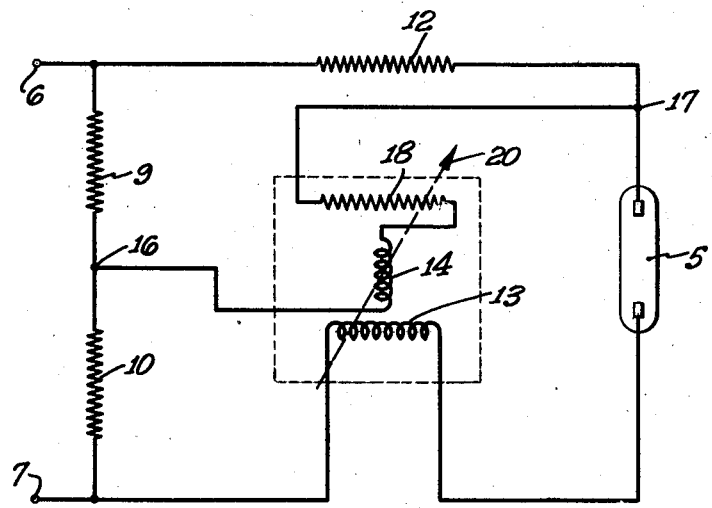
Figure 2 is a schematic drawing of the measuring circuit embodying the invention.

Thus, in Figure 2 a wattmeter energizing and measuring circuit is shown in accordance with the invention. A vapor lamp 5 is connected to a source of direct current at terminals 6 and 7, across which is a potential divider shunt comprising resistances 9 and 10. A ballast resistance 12 is shown in series with the lamp 5, while the fixed current coil 13 of a dynamometer type wattmeter is also connected in series with the lamp. The movable voltage coil 14 of the meter is connected to the potential divider at point 16 and to one terminal of the lamp at point 17, this circuit including a multiplier resistance 18. The usual pointer 20 attached to the movable coil 14 is shown.

In the above circuit the fixed current coil 13 carries the entire lamp current but the movable voltage coil 14 is only connected across the lamp and the bias voltage resistance 10. In this manner, as explained above, the single indication of the wattmeter will give the product of the total current and the differential ($V - V_0$) between the total voltage drop V and the bias voltage $V_0$ which product is proportional to the light output from the lamp 5. It has been found that this single indication method of and means for measuring light output has provided more reliable results than the usual measurements of power input to the lamp.

What is claimed is:

1. A measuring circuit for measuring the light output of a vapor lamp comprising a source of energy for said lamp, a wattmeter having a fixed coil connected in series with said lamp and said source of energy, and a movable coil for said wattmeter connected in shunt with said lamp and across a portion of the voltage of said energy source, said voltage portion being determined by the voltage value for zero light output at the intersection of the extended characteristics between voltage and light output for said vapor lamp operating at different current values.

2. A light output measuring system for a vapor lamp comprising a source of energy for said lamp, a voltage divider, a wattmeter having fixed coil in series with said lamp and said source of energy, and a movable coil for said wattmeter connected between one terminal of said lamp and a point on said voltage divider, said point on said voltage divider providing a voltage determined by the voltage value for zero light output at the intersection of the extended characteristics between voltage and light output for said vapor lamp when operating at different current values.

3. A light output measuring system for a vapor lamp comprising a wattmeter having a fixed coil and a movable coil, a source of energy for said lamp, said source of energy being connected in series with the fixed coil and said wattmeter, and means for connecting the movable coil of said wattmeter across a portion of said energy source, said portion being determined by the voltage value for zero light output at the intersection of the extended characteristics between voltage and light output for said vapor lamp operating at different current values.

4. The method of measuring or indicating with a single measurement the light output of a vapor lamp comprising utilizing the total current through said lamp and the lamp voltage drop less a fixed bias voltage as a measure of the light output of said lamp, said bias voltage being determined by the voltage value for zero light output at the intersection of the extended characteristics between voltage and light output at different current values for said vapor lamp.

5. The method of energizing and measuring the light output of a vapor lamp comprising measuring the product of the current through the lamp and the voltage drop across the lamp minus a predetermined fixed bias voltage determined by the voltage value for zero light output at the intersection of the extended characteristics between voltage and light output at different current values for said vapor lamp.

6. The method of measuring the light output of a vapor lamp with a single measurement comprising indicating the product of the current through the lamp and a portion of the total voltage applied to said lamp, said portion being the difference between said total voltage less a predetermined bias voltage determined by the voltage value for zero light output at the intersection of the extended chaarcteristics between voltage and light output for said vapor lamp when operating at different current values.

7. A system for measuring the variations in light output from a vapor lamp comprising a source of energy for said lamp, a wattmeter having a fixed coil and a movable coil, means for passing the current through said lamp through said fixed coil, and means for impressing the voltage across said lamp minus a predetermined bias voltage on said movable coil, said bias voltage being determined by the voltage values for zero light output at the intersection of the extended characteristics between voltage and light output for said vapor lamp operating at different current values.

8. A system in accordance with claim 7, in which said last mentioned means includes a potential divider for said source of energy.

ROBERT L. HAYNES.